US011970004B2

(12) United States Patent
Sato et al.

(10) Patent No.: US 11,970,004 B2
(45) Date of Patent: Apr. 30, 2024

(54) LIQUID DISCHARGE HEAD

(71) Applicant: CANON KABUSHIKI KAISHA, Tokyo (JP)

(72) Inventors: Tomohiro Sato, Tokyo (JP); Shuzo Iwanaga, Kanagawa (JP); Takatsugu Moriya, Tokyo (JP); Koichi Ishida, Tokyo (JP); Shingo Okushima, Kanagawa (JP); Shintaro Kasai, Kanagawa (JP); Yoshiyuki Nakagawa, Kanagawa (JP); Akiko Hammura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 17/719,213

(22) Filed: Apr. 12, 2022

(65) Prior Publication Data

US 2022/0339934 A1 Oct. 27, 2022

(30) Foreign Application Priority Data

Apr. 22, 2021 (JP) ................................ 2021-072521

(51) Int. Cl.
*B41J 2/14* (2006.01)

(52) U.S. Cl.
CPC .................................. *B41J 2/1433* (2013.01)

(58) Field of Classification Search
CPC ....... B41J 2/1433; B41J 2/14032; B41J 2/145
See application file for complete search history.

(56) References Cited

U.S. PATENT DOCUMENTS

2018/0056654 A1* 3/2018 Sato .................... B41J 2/14233

FOREIGN PATENT DOCUMENTS

JP 2016170768 A 9/2016

* cited by examiner

*Primary Examiner* — Jason S Uhlenhake
(74) *Attorney, Agent, or Firm* — Canon U.S.A., Inc. I.P. Division

(57) ABSTRACT

A liquid discharge head includes a liquid discharge substrate that has a discharge-orifice row, pressure generating elements, and pressure chambers. The liquid discharge head discharges a liquid in a block-by-block manner using sequential driving. The discharge-orifice row is disposed so as to incline at an angle θ=Arctan (d1/d2) relative to a direction extending orthogonal to the conveyance direction of the medium, in which d1 (μm) is a disposition spacing of the discharge orifices in the discharge-orifice row in the conveyance direction and d2 (μm) is a disposition spacing of the discharge orifices in the discharge-orifice row in the direction orthogonal to the conveyance direction. A partition wall is formed between adjacent pressure chambers so as to separate the adjacent pressure chambers from each other. The partition wall has a communicating portion that communicates the adjacent pressure chambers with each other.

14 Claims, 16 Drawing Sheets

LIQUID DISCHARGE HEAD

BACKGROUND

Field of the Disclosure

The present disclosure relates to a liquid discharge head that discharges a liquid, such as ink.

Description of the Related Art

A type of recording apparatus that performs recording by discharging a liquid, such as ink, onto a record medium, such as a sheet of paper, includes a liquid discharge head that has, for example, discharge orifices for discharging the liquid, pressure generating elements generating pressure for discharge, and pressure chambers in which the pressure generated by respective pressure generating elements is transmitted. In such a liquid discharge head, a phenomenon that pressure generated by a pressure generating element in a pressure chamber is propagated to another pressure chamber is known to occur. This phenomenon is called "crosstalk". If the crosstalk occurs, the pressure propagated destabilizes the position of the surface of the liquid (meniscus) in the affected discharge orifice, which may affect the quality of recording. The influence of the crosstalk can become more conspicuous in the case, for example, where the discharge orifices are disposed densely to increase the resolution of recording.

Japanese Patent Application No. 2016-170768 discloses a liquid discharge head that can reduce the influence of the crosstalk. The liquid discharge head employs a sequential driving method for so-called time-divisional driving in which multiple discharge orifices are allocated in multiple liquid-discharge groups. The time-divisional driving changes discharge timing and causes a shift in landing position of liquid droplets on a record medium. To suppress this, Japanese Patent Application No. 2016-170768 describes a configuration in which a discharge-orifice row having multiple discharge orifices is disposed so as to incline at a predetermined angle θ. In addition, to reduce the influence of the crosstalk, the liquid discharge head of Japanese Patent Application No. 2016-170768 has partition walls that completely separate (or partition) respective adjacent pressure chambers from each other to prevent the adjacent pressure chambers from communicating with each other.

In the liquid discharge head of Japanese Patent Application No. 2016-170768, each partition wall completely partitions adjacent pressure chambers from each other. Accordingly, if the partition wall swells with the liquid, there is not enough room to accommodate the amount of the swell. The swollen partition wall in the confined space has to displace a discharge-orifice defining member and may result in an excessive deformation of the discharge-orifice defining member. The excessive deformation of the discharge-orifice defining member changes the shape of the discharge orifice, which results in the deterioration of recording quality due to, for example, a change in the amount of discharge and a change in the landing position of liquid droplets.

SUMMARY

Aspects of the present disclosure provide a liquid discharge head that can reduce the influence of the crosstalk and can prevent the discharge-orifice defining member from deforming excessively.

According to an aspect of the present disclosure, a liquid discharge head comprising: a liquid discharge substrate having a discharge-orifice row having multiple discharge orifices that discharge a liquid to a record medium conveyed in a first direction, multiple pressure generating elements that generate pressure for discharging the liquid from respective discharge orifices, and multiple pressure chambers that communicate with respective discharge orifices and in which the pressure generated by respective pressure generating elements is transmitted, wherein the discharge orifices in the discharge-orifice row are allocated in multiple blocks and the liquid is discharged from the discharge orifices using sequential driving in a block-by-block manner, the discharge-orifice row is inclined at an angle $\theta = \text{Arctan}(d1/d2)$ relative to a second direction extending orthogonal to the first direction, in which d1 (μm) is a disposition spacing of the discharge orifices in the discharge-orifice row in the first direction and d2 (μm) is a disposition spacing of the discharge orifices in the discharge-orifice row in the second direction, a partition wall is formed between adjacent pressure chambers so as to separate the adjacent pressure chambers from each other, and the partition wall has a communicating portion that communicates the adjacent pressure chambers with each other.

Further features of the present disclosure will become apparent from the following description of exemplary embodiments with reference to the attached drawings.

DESCRIPTION OF THE EMBODIMENTS

First Embodiment

A first embodiment of a liquid discharge head according to the present disclosure will be described with reference to FIGS. 1 to 5.

Overall Structure of Recording Apparatus

Figure 1:
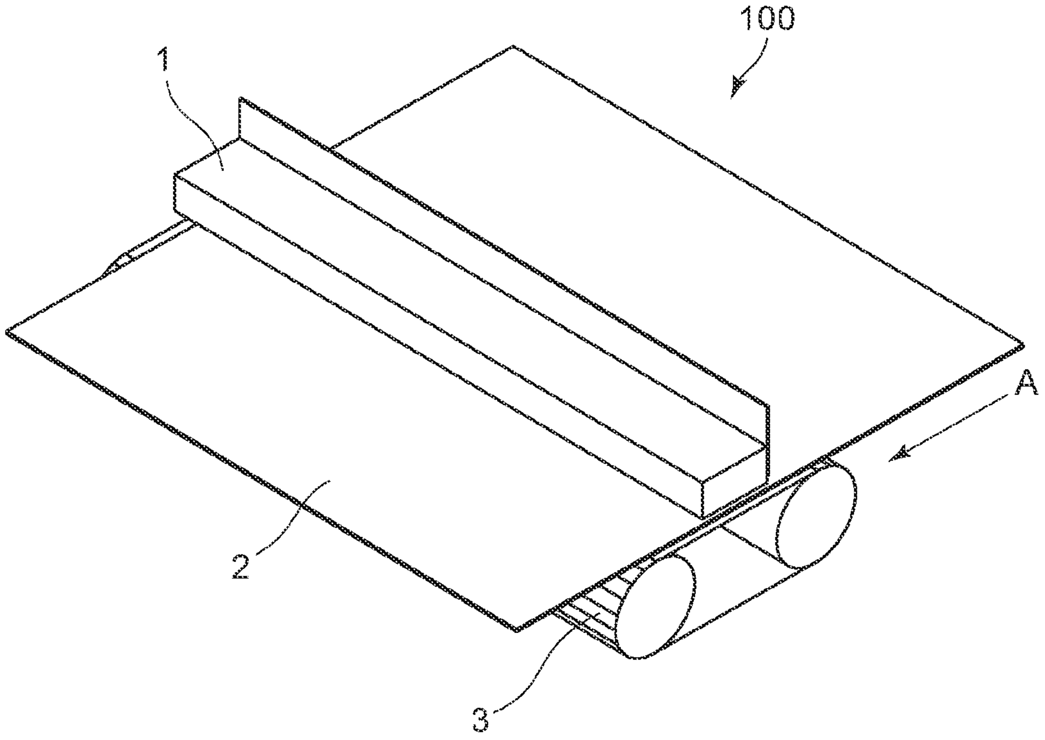
FIG. 1 is a perspective view illustrating a recording apparatus.

FIG. 1 illustrates an example of a recording apparatus 100 to which the present embodiment is applicable. The recording apparatus 100 of FIG. 1 is a so-called one-pass type recording apparatus that can record an image onto a record medium 2 while the record medium 2 passes one time. The recording apparatus 100 includes a full-line type liquid discharge head 1 in which liquid discharge orifices are arrayed over the width of the liquid discharge head 1 that corresponds to the full width of the record medium 2. A conveyance unit 3 conveys the record medium 2 in the direction of arrow A (in the first direction), and the liquid discharge head 1 performs recording thereon. The liquid discharge head 1 of the present embodiment can be implemented in various forms of which one example is illustrated in FIG. 1. Accordingly, the liquid discharge head 1 is not limited to any particular form of implementation.

Structure of Liquid Discharge Head

Figure 2:
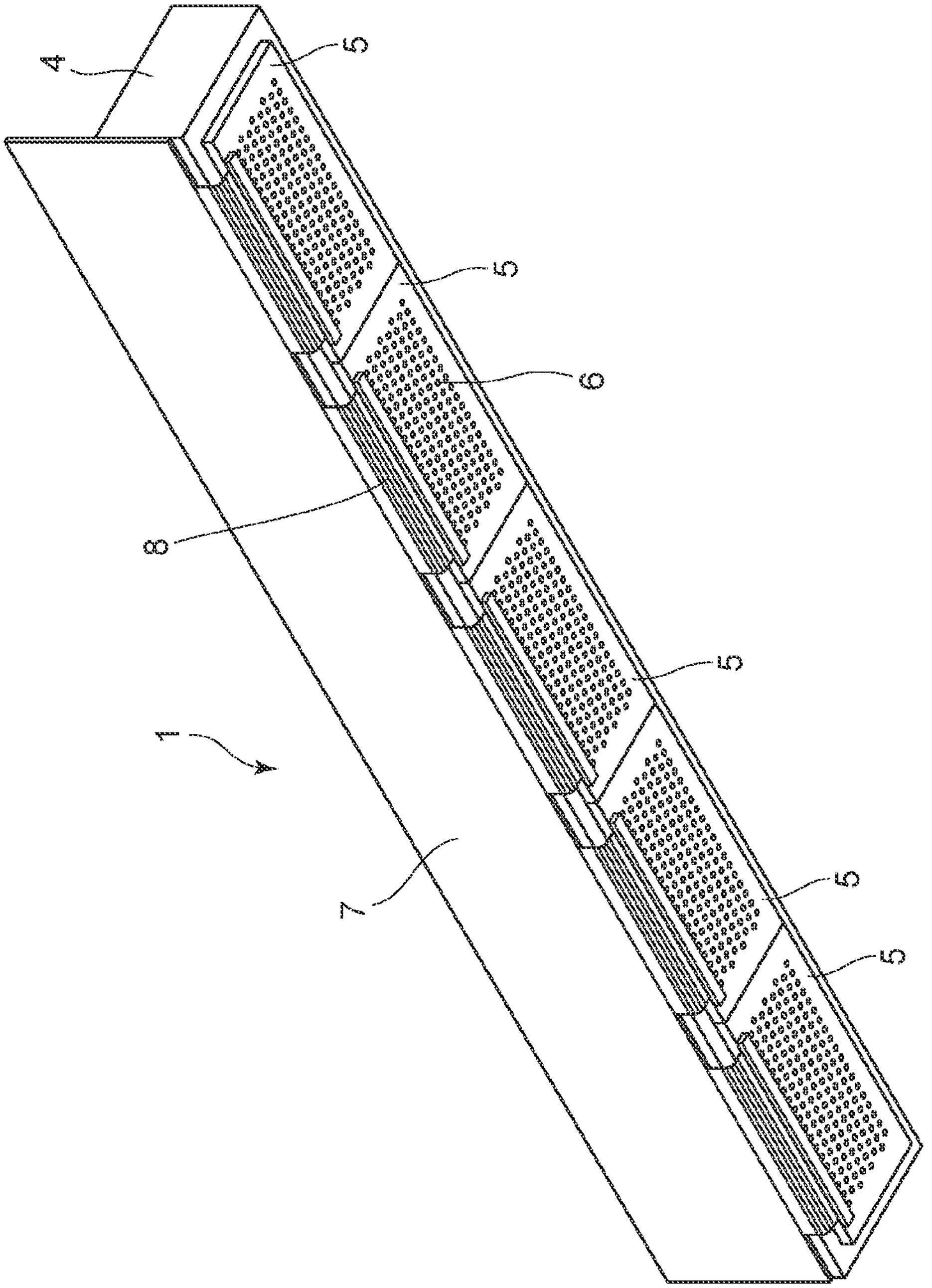
FIG. 2 is a schematic view illustrating a liquid discharge head.

FIG. 2 schematically illustrates the liquid discharge head 1 to which the present embodiment is applicable. The liquid discharge head 1 includes a head body 4 on which multiple liquid discharge substrates 5 are disposed. Color inks are supplied from corresponding ink tanks (not illustrated) to the liquid discharge substrates 5 through common supply ports (not illustrated) in the head body 4. The inks supplied to the liquid discharge substrates 5 flow through respective internal channels and are discharged from discharge orifices 6 onto the record medium 2. The head body 4 also includes an electric substrate 7 that supplies electric power and signals required to operate discharge orifices 6. The electric substrate 7 is connected to the liquid discharge substrates 5 using wiring 8.

Structure of Liquid Discharge Substrate

Figure 3A:
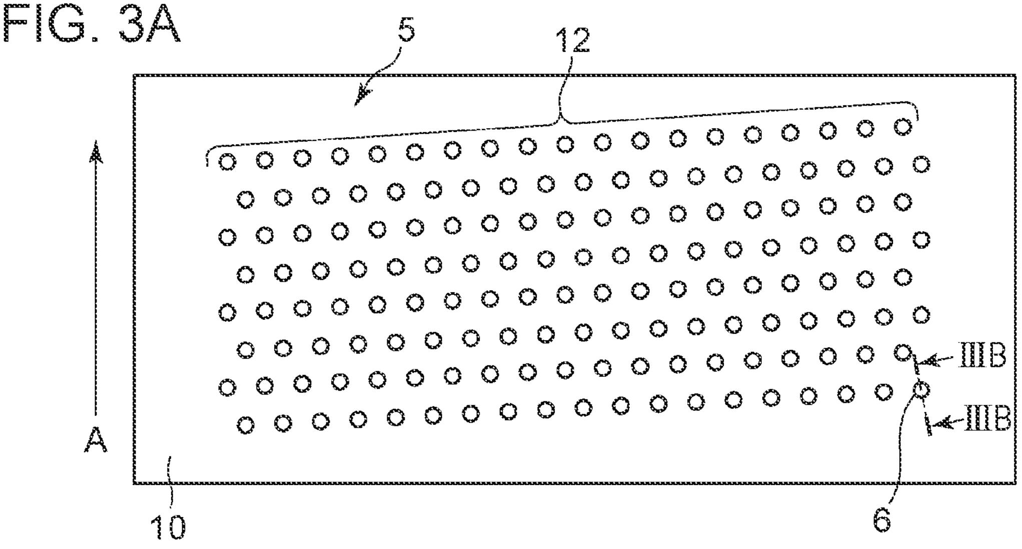
FIG. 3A is a plan view illustrating a liquid discharge substrate according to a first embodiment.
Figure 3B:
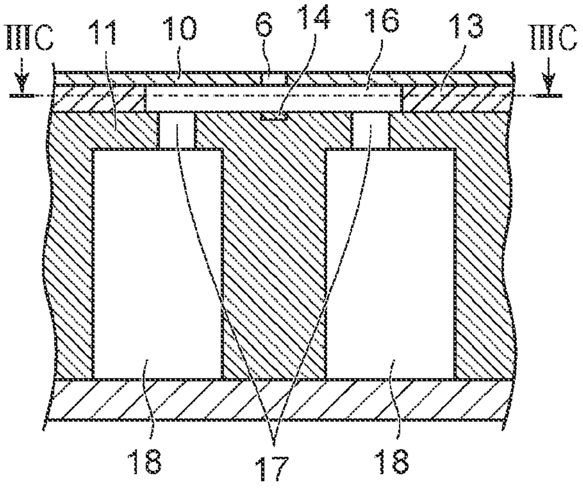
FIGS. 3B and 3C are cross-sectional views illustrating the liquid discharge substrate according to the first embodiment.
Figure 3C:
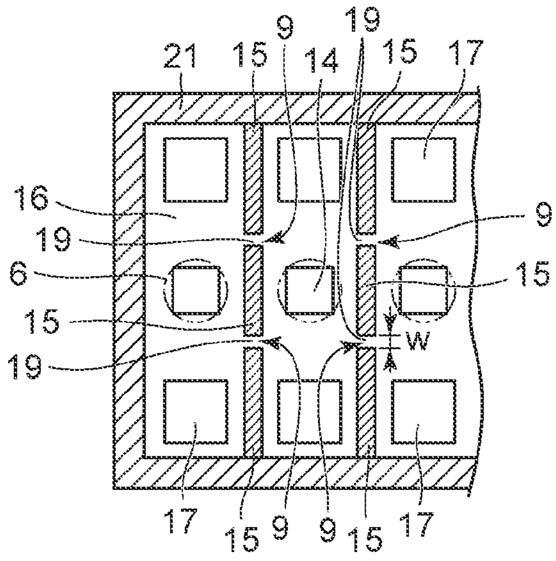

FIGS. 3A to 3C are schematic views illustrating the liquid discharge substrate 5 of the present embodiment. FIG. 3A is a plan view of the liquid discharge substrate 5. FIG. 3B is a cross-sectional view taken along line IIIB-IIIB in FIG. 3A. FIG. 3C is a cross-sectional view taken along line IIIC-IIIC in FIG. 3B. As illustrated in FIG. 3B, the liquid discharge substrate 5 of the present embodiment includes a substrate 11, a channel forming member 13 formed over the substrate 11, a discharge-orifice defining member 10 formed over the channel forming member 13, and multiple discharge orifices 6 are formed in the discharge-orifice defining member 10. The discharge orifices 6 are arrayed in a discharge-orifice row 12. The substrate 11 may be made of a material to be used, for example, for semiconductor substrates. Accordingly, electronic devices (such as pressure generating elements, electric circuits, electric wiring, and temperature sensors) can be formed on the surface of the substrate 11 using the semiconductor processing technology, and ink channels can be formed therein using the MEMS processing technology. The channel forming member 13 and the discharge-orifice defining member 10 can be formed of an arbitrary material, for example, a resin substrate with which discharge orifices are formed by laser processing, an inorganic plate with which channels can be formed using a dicing machine, a photosensitive resin with which discharge orifices and channels are formed using photo-curing, or a semiconductor substrate with which discharge orifices and channels are formed using the MEMS processing technology.

In the present embodiment, the liquid discharged from all of the discharge orifices is a single color ink. However, different discharge-orifice rows may discharge different color inks. In such a case, related-color liquids or different color-depth liquids can be used to suppress irregularities of color depth in printing. The liquid to be discharged may be a liquid other than ink. As illustrated in FIGS. 3B and 3C, a pressure generating element 14 is disposed at a position corresponding to each discharge orifice 6. The pressure generating element 14 generates the pressure for discharging the liquid.

A discharge-orifice-row forming partition 21 is formed so as to surround the entire discharge-orifice row 12 in which discharge orifices 6 are arrayed, and individual partition walls 15 (also referred to simply as “partition walls” or “dividing walls”) are provided between respective adjacent discharge orifices 6. A pressure chamber 16 having one pressure generating element 14 is formed (partitioned) by the discharge-orifice-row forming partition 21 and corresponding individual partition walls 15. Note that the discharge-orifice-row forming partition 21 is part of the channel forming member 13.

The pressure generating element 14 heats and boils the liquid in response to a pulse signal received from the electric wiring (not illustrated) disposed in the substrate 11. The liquid is discharged from each discharge orifice 6 due to the pressure generating element 14 boiling the liquid and generating bubbles. In the present embodiment, the pressure generating element 14 discharges the liquid due to bubble generation. The liquid, however, may be discharged, for example, using a piezoelectric element. In the present embodiment, the liquid circulates between the inside and the outside of the pressure chamber 16.

As illustrated in FIG. 3C, common channels 18 extend in the substrate 11 along the discharge-orifice row 12 at both sides across the discharge orifices 6, and the common channels 18 are in communication with the pressure chambers 16 through corresponding individual channels 17. In the present embodiment, the liquid flows into each pressure chamber 16 from the common channels 18 through the individual channels 17. The liquid may flow circularly. For example, the liquid flows into the pressure chamber 16 from one of the common channels 18 through one of the individual channels 17 and may return to the other common channel 18 through the other individual channel 17. In the present embodiment, each pressure chamber 16 is served by two individual channels 17 and two common channels 18. Alternatively, two individual channels 17 of each pressure chamber 16 may communicate with one common channel 18, or one individual channel 17 and one common channel 18 may be formed to serve each pressure chamber 16.

Crosstalk

Figure 4:
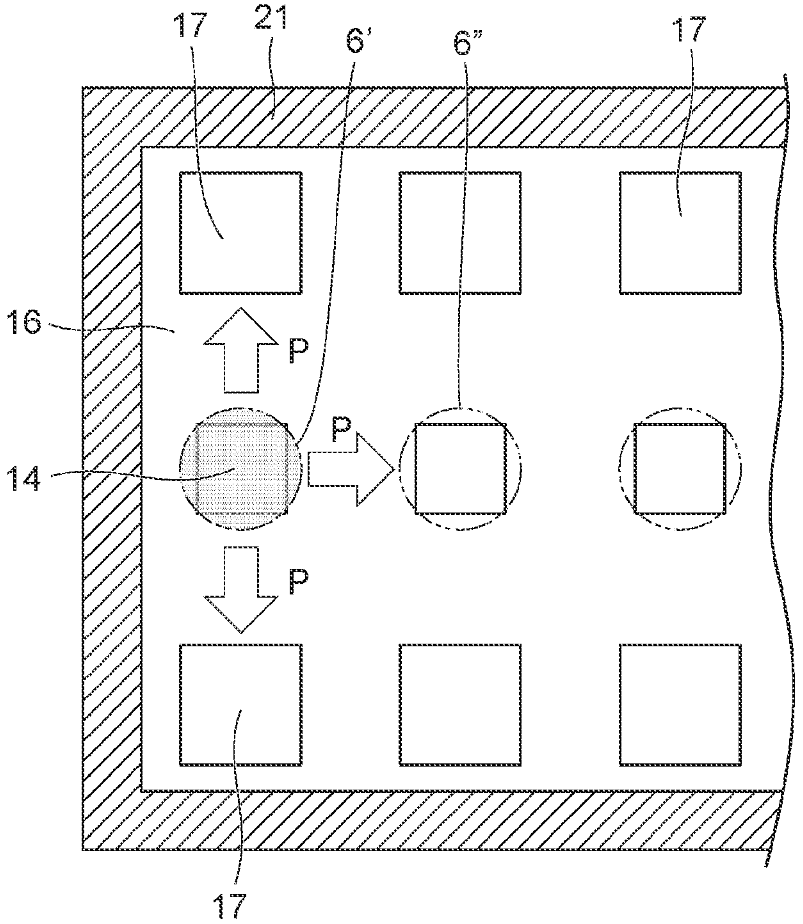
FIG. 4 is a cross-sectional view illustrating a comparative example in which the liquid discharge substrate does not include individual partition walls.

FIG. 4 illustrates a comparative example of the present embodiment. FIG. 4 is a cross-sectional view corresponding to FIG. 3C and illustrating a liquid discharge substrate that does not include the individual partition walls 15 for partitioning the pressure chambers 16. When a discharge orifice 6' discharges the liquid, bubble formation generates a pressure wave P in the liquid around the orifice. When the pressure wave P reaches an adjacent discharge orifice 6", the surface (meniscus) of the liquid in the discharge orifice 6" moves. When the liquid is discharged from the discharge orifice 6" in this state, the amount of the liquid discharged increases in the case of the surface of the liquid being shaped more convexly than normal in the discharge orifice 6", or the amount of the liquid discharged decreases in the case of the surface of the liquid being shaped more concavely than normal, which causes irregularities in the amount of liquid discharged onto the printing medium. This leads to irregularities of color depth of the ink on the printing medium and deteriorates printing quality. Although the pressure wave P also propagates through the individual channels 17, the common channels 18 extending along the discharge-orifice row 12 has a sufficient volume to attenuate the pressure wave P. Accordingly, the influence of the crosstalk on adjacent pressure chambers 16 through the common channels 18 is negligible.

Swelling

Figure 5A:
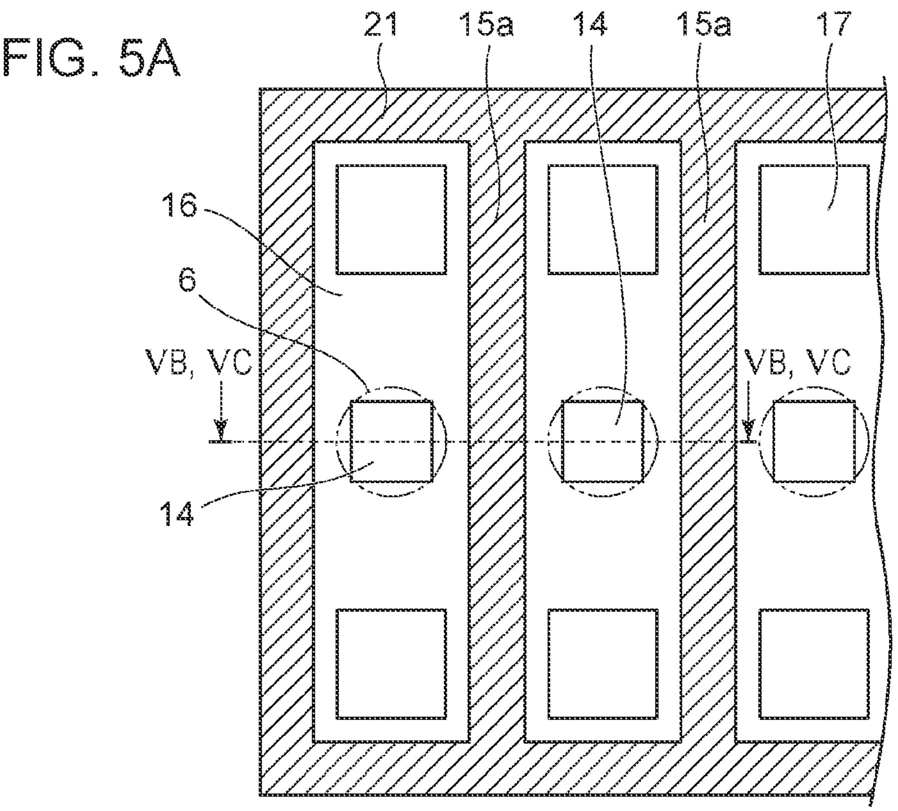
FIGS. 5A, 5B, 5C are cross-sectional views illustrating a comparative example in which the individual partition walls separate adjacent pressure chambers completely.
Figure 5B:
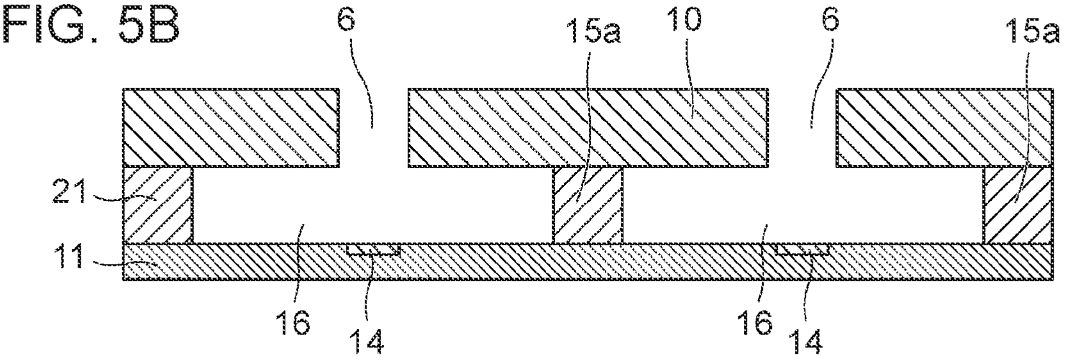
Figure 5C:
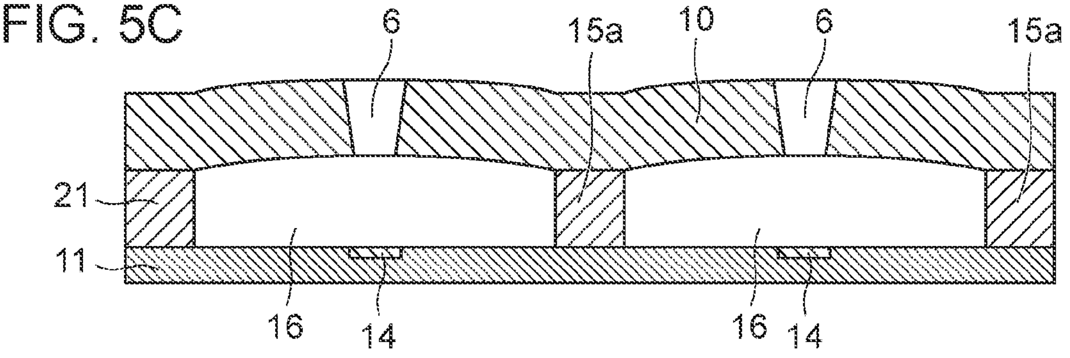

FIG. 5A is a cross-sectional view corresponding to FIG. 3C illustrating another comparative example of the present embodiment, in which the liquid discharge substrate 5 has the individual partition walls 15*a* that separate adjacent pressure chambers 16 completely. FIGS. 5B and 5C are cross-sectional views taken along line VB-VB in FIG. 5A. In order to suppress the above-described crosstalk, it is effective to separate adjacent pressure chambers 16 completely as illustrated in FIG. 5A. The pressure chambers 16 have sections illustrated in FIG. 5B when the ink is not present. The pressure chambers 16, however, deform into a state illustrated in FIG. 5C due to the discharge-orifice defining member 10 coming into contact with ink and thereby swelling. When the partition walls separate adjacent pressure chambers completely, the amount of deformation increases. This results in the deformation of the discharge orifices 6 and unexpectedly changes the amount of ink discharged. This leads to irregularities of color depth of the ink on the printing medium and deteriorates the quality of recording.

Advantageous Effects of First Embodiment

In the present embodiment illustrated in FIG. 3C, the pressure chambers 16 are separated by the individual partition walls 15 that have non-dividing portions 19 (otherwise referred to as "communicating portions 19"), which reduces the influence of the swelling. This is because the non-dividing portions 19 provides spaces 9 that absorb the amount of swelling even when the individual partition wall 15 swells. The spaces 9, which absorb the swell of the individual partition wall 15, can reduce the likelihood of the individual partition wall 15 displacing the discharge-orifice defining member 10 even if the individual partition wall 15 swells. This prevents excessive deformation of the discharge-orifice defining member 10. As illustrated in FIG. 3C, two non-dividing portions 19 are formed at symmetrical positions with respect to a line connecting the centers of the discharge orifices 6 in the discharge-orifice row 12. The deformation of the discharge-orifice defining member 10 can be further reduced since the non-dividing portions 19 are formed in line symmetry and the spaces allowed for swelling are provided evenly. The communicating portions 19 are formed in each partition wall, and adjacent pressure chambers separated by the partition wall communicate with each other at communicating portions 19. Note that the communicating portions 19 are small. Accordingly, the influence of the crosstalk is negligibly small even if the adjacent pressure chambers communicate with each other via the communicating portions 19.

Even if the gap w of each non-dividing portion 19 is small, it is effective to counteract the swelling. The gap w may be as small as possible. The larger the non-dividing portion 19, the more the influence of the crosstalk, as is the case in which no individual partition wall 15 is provided. More specifically, the gap w is preferably 10 μm or less, and more preferably 5 μm or less, when the spacing between adjacent discharge orifices is set to satisfy 600 dpi and the diameter of each discharge orifice is set to be 20 μm. In the present embodiment, the gap w is 5 μm.

Figure 6A:
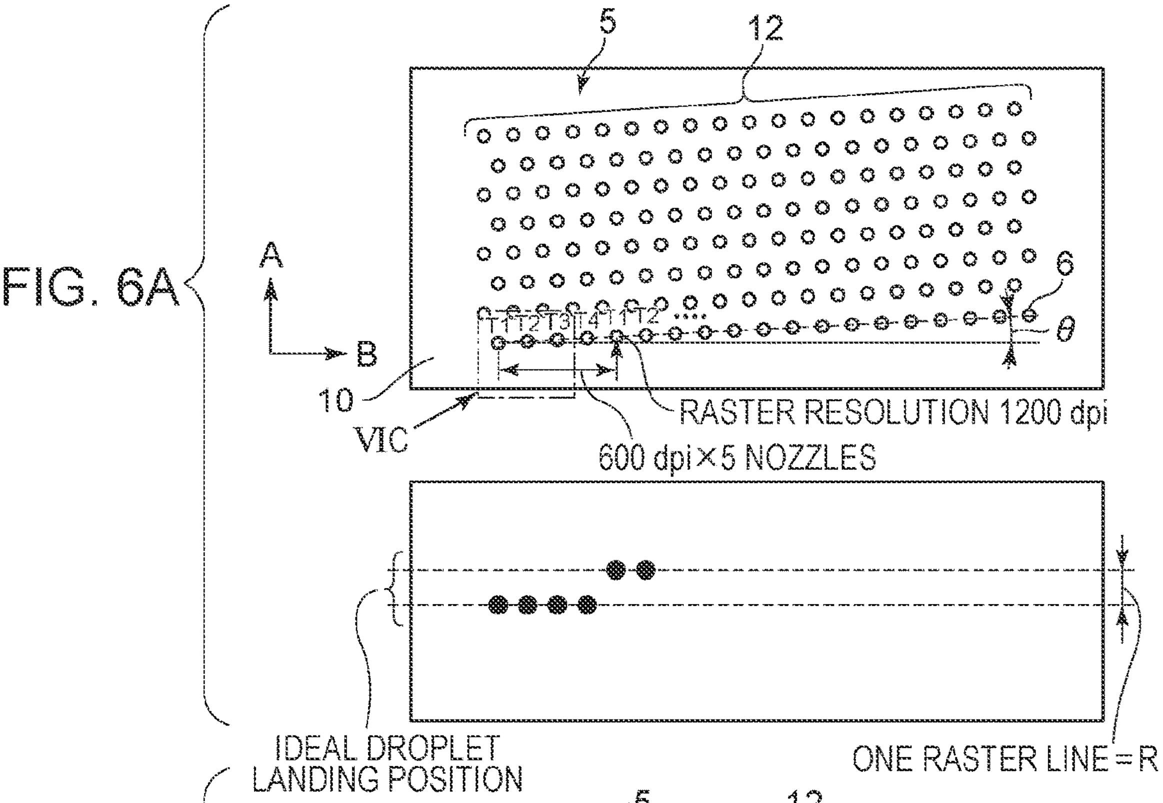
FIG. 6A includes a plan view of the liquid discharge substrate according to the first embodiment and a view for explanation of landing positions of liquid droplets.
Figure 6B:
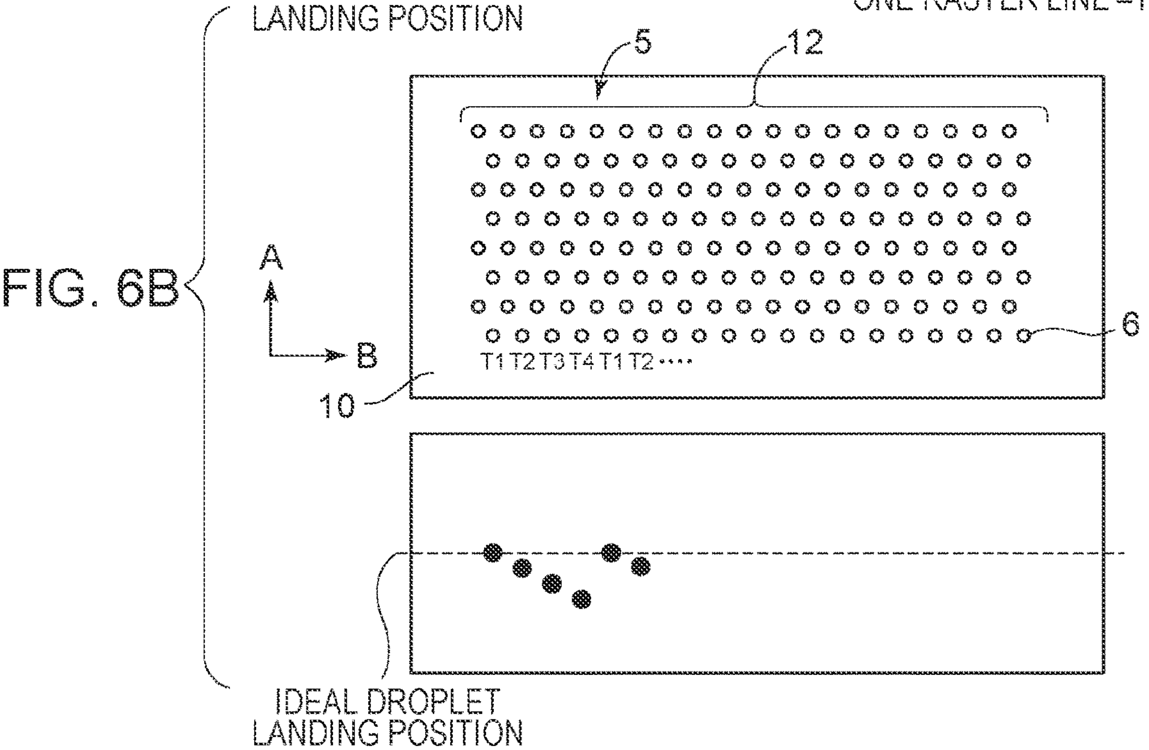
FIG. 6B includes a plan view of the liquid discharge substrate according to a comparative example and a view for explanation of landing positions of liquid droplets.
Figure 6C:
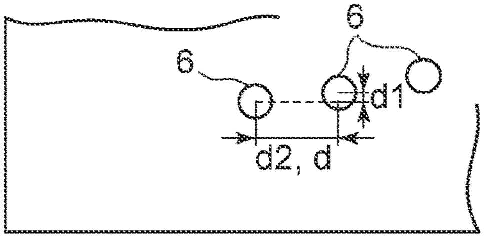
FIG. 6C is a view for explanation of positional relationship of discharge orifices.
Figure 7:
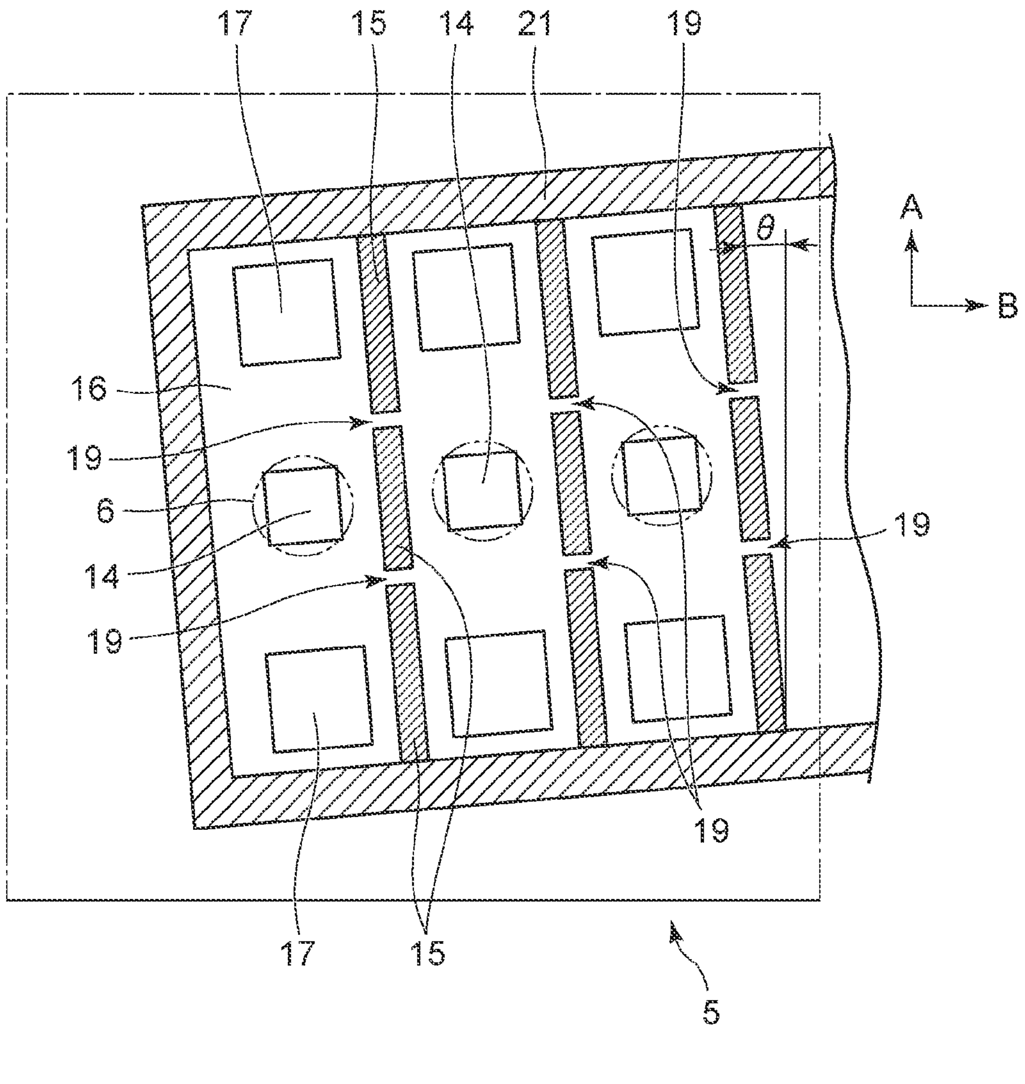
FIG. 7 is a cross-sectional view of region VIC in FIG. 6A taken along line IIIC-IIIC in FIG. 3B.

Discharge-orifice Row, Disposal of Partition Walls, and Example of Discharge Timing FIGS. 6A, 6B, and 6C are schematic views for explanation of positions of the discharge orifices 6. FIG. 6A includes a plan view of the liquid discharge substrate 5 of the present embodiment and a view illustrating positions of liquid droplets landed on a record medium 2. FIG. 6B includes a plan view of a liquid discharge substrate 5 according to a comparative example of the present embodiment and a view for explanation of landing positions of liquid droplets landed on the record medium 2. In this case, the discharge-orifice row 12 extends in the direction orthogonal to the conveyance direction A of the record medium 2. FIG. 7 is a view illustrating region VIC in FIG. 6A as viewed through the discharge-orifice defining member 10.

In the liquid discharge substrate illustrated in FIG. 6B, it is desirable to discharge liquid droplets simultaneously from all of the discharge orifices in the discharge-orifice row 12 in order to cause the liquid droplets from the same discharge-orifice row 12 to land so as to line up perfectly in the direction orthogonal to the sheet conveyance direction A. Simultaneous discharge of all of the discharge orifices, however, is difficult from a viewpoint of electric power and of liquid supply. In the present embodiment, the discharge orifices in the discharge-orifice row 12 are allocated in four discharge-timing blocks, and the discharge orifices discharge at respective discharge timings T1, T2, T3, and T4. More specifically, the discharge orifices 6 allocated in the block of discharge timing T1 discharge substantially simultaneously. Subsequently, the discharge orifices 6 allocated in the blocks of discharge timings T2, T3, and T4 discharge in this order in the same manner. Then, the discharge operation returns to the discharge timing T1. The discharge operation in which the discharge orifices 6 are allocated in multiple blocks and the discharge orifices 6 discharge in the block-by-block manner is referred to as "time-divisional driving". The time-divisional driving reduces power consumption per unit time required for discharge while increasing the liquid supply speed, which enables the liquid to be discharged at a higher frequency. This time shift operation in discharge, however, causes deviation in landing position of liquid droplets on the record medium 2, which leads to the deterioration of printing quality.

Accordingly, as illustrated in FIG. 6A, the discharge orifices 6 are disposed obliquely at a shifting angle of θ (degrees) so as to compensate the expected amount of the deviation, which can correct the landing positions and suppress the deterioration of printing quality. The shifting angle θ of the discharge orifices may be $\theta = \mathrm{Arctan}(R/(N \times d))$, in which N is the number of time divisions (N is an integer equal to or greater than two), d (μm) is the spacing of the discharge orifices in the direction B (otherwise referred to as the second direction) that is orthogonal to the conveyance direction A of the record medium, and R is the width of one raster line. The shifting angle θ is an angle with which adjacent discharge orifices of the same discharge timing (the distance therebetween is N×d) are shifted from each other by the amount R. Put another way, the shifting angle θ of the discharge orifices can be expressed as θ=Arctan (d1/d2), in which d1 (μm) is the disposition spacing of the discharge orifices in the conveyance direction A (i.e., the distance between adjacent discharge orifices in the conveyance direction A), and d2 (μm), which is the same as d, is the disposition spacing of the discharge orifices in the direction B that is orthogonal to the conveyance direction A (i.e., the distance between adjacent discharge orifices in the direction B). FIG. 6C is an enlarged view of region VIC in FIG. 6A. FIG. 6C illustrates disposition spacings d1, d2, and d of the discharge orifices.

With this arrangement of the discharge orifices 6, liquid droplets discharged from the adjacent discharge orifices 6 of the same discharge timing land on the record medium 2 at positions spaced by one raster line in the conveyance direction A, which enables printing with required resolution in the conveyance direction A of the record medium 2 and can suppress the deterioration of printing quality. In the present embodiment, the number of the time divisions N is set to be four. The discharge orifices 6 are arranged in the discharge-orifice row 12 so as to satisfy a resolution of 600 dpi in the direction orthogonal to the conveyance direction A of the record medium 2, and the adjacent discharge orifices 6 of the same discharge timing are arranged so as to satisfy a resolution of 1200 dpi in the conveyance direction A of the record medium 2. The angle θ is calculated from these parameters. Note that these parameters may vary depending on the required performance and specifications of the liquid discharge head.

In the present embodiment, the liquid discharge substrate 5 is shaped like a rectangle with one side disposed parallel to the conveyance direction A of the record medium 2, and the discharge orifices 6 are disposed obliquely. Alternatively, the discharge-orifice rows 12 may be disposed parallel to one side of the rectangularly shaped liquid discharge substrate 5, and the entire liquid discharge substrate 5 may be disposed obliquely at an angle θ.

In the time-divisional driving of the present embodiment, the sequential driving method is adopted, in which the discharge orifices 6 are allocated in the four discharge timings T1, T2, T3, and T4 and the discharge orifices 6 discharge consecutively in the order of these four discharge timings. If the distributed driving method in which the discharge timings are distributed among the discharge orifices 6 is adopted for the time-divisional driving, it becomes difficult to change positions of the discharge orifices 6 so as to compensate deviated landing positions of the liquid droplets because this requires irregular positioning of the discharge orifices 6 and makes it difficult to dispose the common channels 18 and the individual channels 17. In the case of the sequential driving method, however, it is sufficient to simply incline the discharge-orifice rows 12 or the liquid discharge substrate 5 in order to shift the positions of the discharge orifices 6 so as to compensate deviated landing positions of liquid droplets. In this case, the common channels 18 and the individual channels 17 can be disposed easily. Accordingly, the sequential driving method is adopted for the time-divisional driving of the present embodiment. In addition, in the present embodiment, the discharge orifices 6 are disposed equidistantly in order to obtain uniform resolution in the direction orthogonal to the conveyance direction A of the record medium. In this case, the discharge timings T1, T2, T3, and T4 for the discharge orifices 6 can be set to be equal. This enables consistent printing in the conveyance direction A of the record medium 2 and also in the direction B orthogonal to the conveyance direction A, which can suppress the deterioration of recording quality.

The following describes disposition of the individual partition walls 15. FIG. 7 is a cross-sectional view of region VIC in FIG. 6A taken along line IIIC-IIIC in FIG. 3B. The discharge orifices 6 can be disposed densely in order to respond to the recent demand for high resolution printing. For this purpose, the thickness of the individual partition walls 15 is reduced as much as possible. On the other hand, if the individual partition walls 15 is made too thin, the area of adhesion to the discharge-orifice defining member 10 becomes too small and increases the likelihood of the discharge-orifice defining member 10 peeling off. The individual partition walls 15 need to provide at least a minimum requisite area for adhesion. For this purpose, each individual partition wall 15 may extend in the direction orthogonal to the extending direction of the discharge-orifice row, in other words, in a direction inclining at an angle θ relative to the conveyance direction A. Put another way, the extending direction of each individual partition wall 15 intersects the conveyance direction A at an angle θ. If the individual partition wall 15 does not incline relative to the conveyance direction A, the shapes of the pressure chambers become unequal, which is not desirable in view of discharge performance.

Second Embodiment—Pressure Chamber with Multiple Discharge Orifices

Figure 8A:
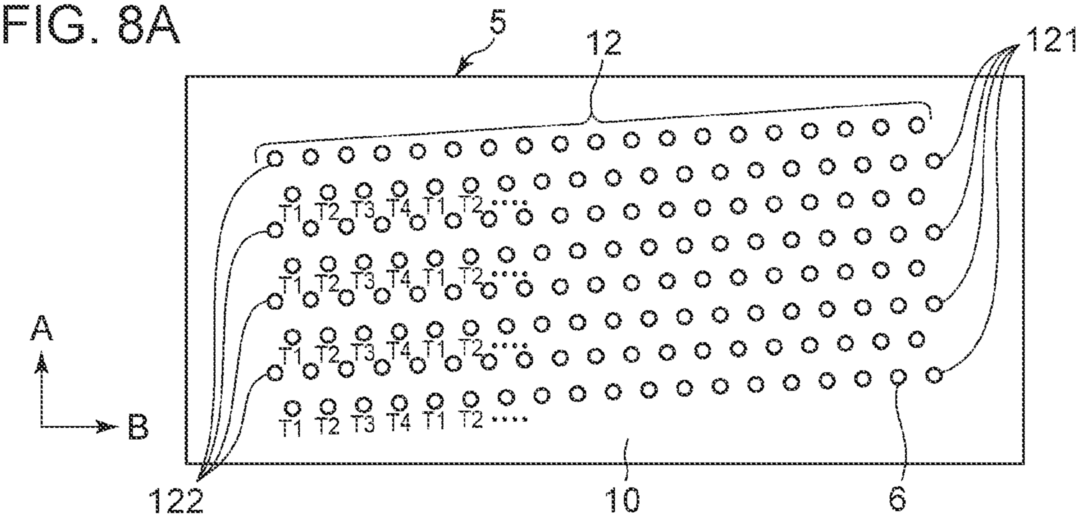
FIG. 8A is a plan view illustrating a liquid discharge substrate according to a second embodiment.
Figure 8B:
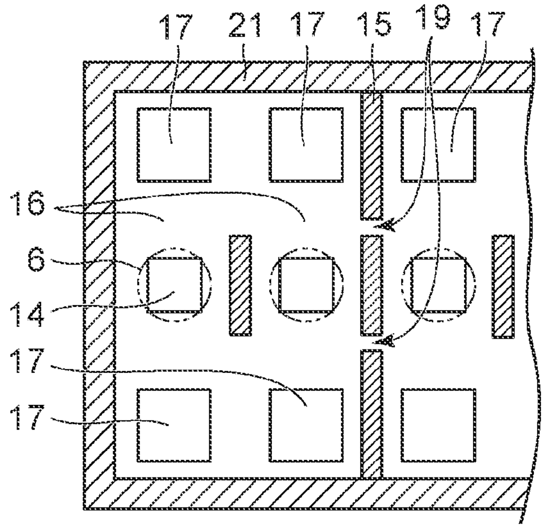
FIGS. 8B and 8C are cross-sectional views illustrating the liquid discharge substrate according to the second embodiment.
Figure 8C:
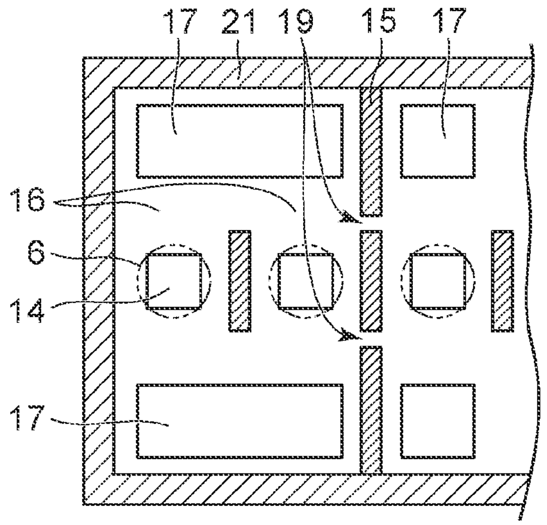

A second embodiment according to the present disclosure will be described with reference to FIGS. 8A, 8B, and 8C. FIGS. 8A to 8C are schematic views illustrating a liquid discharge substrate 5 of the present embodiment. FIG. 8A is a plan view of the liquid discharge substrate 5. FIGS. 8B and 8C are cross-sectional views corresponding to FIG. 3C. In the first embodiment, the individual discharge orifices 6 and the corresponding individual pressure chambers 16 are separated by the individual partition walls 15. In this case, if foreign matter in the liquid clogs an individual channel 17 or a pressure chamber 16, the corresponding discharge orifice 6 communicating with the pressure chamber 16 ceases to operate. In order to prevent this, in the present embodiment, the liquid can flow between two pressure chambers 16 as illustrated in FIG. 8B. Accordingly, even if one of the individual channels 17 in the pressure chamber 16 clogs, the other individual channel 17 can supply the liquid to discharge.

In the illustrated example of the present embodiment, the liquid can flow between two pressure chambers 16, but the liquid may flow freely among three or more pressure chambers. Multiple pressure chambers among which the liquid flows freely are referred to as a "set of pressure chambers". In the present embodiment, as illustrated in FIG. 8B, four individual channels 17 are formed for two discharge orifices 6 at positions across the discharge orifices 6. As illustrated in FIG. 8C, two larger individual channels 17 may be formed at positions across the discharge orifices 6. Combining individual channels 17 in the same chamber into larger channels reduces the likelihood of the foreign matter clogging. Moreover, the fluid resistance in the channel becomes small, which is advantageous to the supply of liquid.

Disposal of Discharge-Orifice Row Groups and Example of Discharge Timing

In the case where the liquid flows freely among multiple pressure chambers 16, the influence of the crosstalk may become important as described above. In the present embodiment, as illustrated in FIG. 8A, the discharge-orifice rows 12 are grouped into discharge-orifice row groups 121 and 122. Each of the discharge-orifice row groups 121 and 122 includes multiple discharge-orifice rows 12 in which the discharge orifices 6 are disposed at the same positions in the direction (direction B) orthogonal to the conveyance direction A of the record medium. The discharge orifices in the set of pressure chambers 16 among which the liquid flows freely are not used successively. Instead, subsequent discharge is performed by another discharge-orifice row in the same discharge-orifice row group 121 or 122.

Figure 9A:
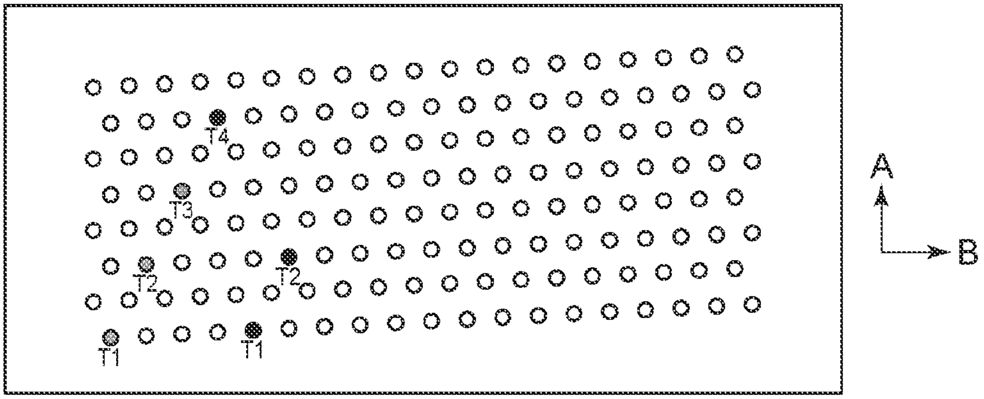
FIGS. 9A, 9B, 9C, and 9D are schematic views for explanation of discharge timing.
Figure 9B:
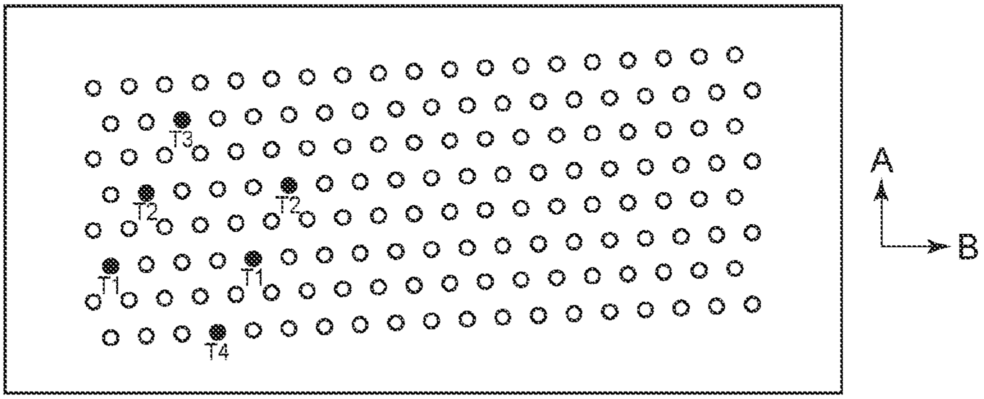
Figure 9C:
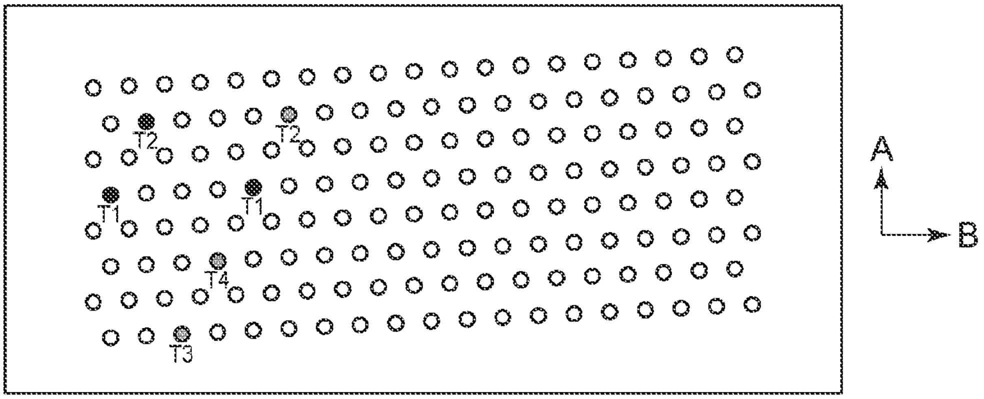
Figure 9D:
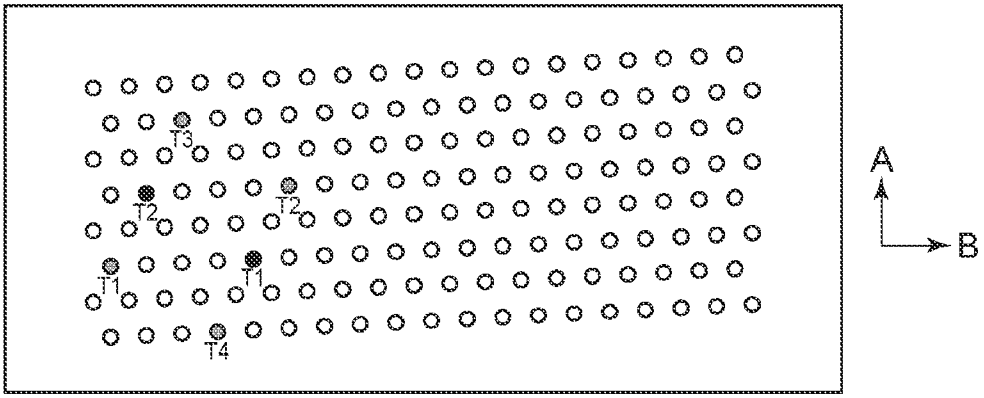

Operations of the time-divisional driving are illustrated specifically in FIGS. 9A to 9D in the case of the discharge orifices 6 being configured as in FIG. 8A. In the present embodiment, the discharge orifices 6 are allocated in four discharge-timing blocks, and the discharge orifices discharge at respective discharge timings T1, T2, T3, and T4. First, as illustrated in FIG. 9A, the liquid discharge head discharges on the basis of the time-divisional driving while the liquid discharge head switches the discharge-orifice rows 12. Subsequently, the liquid discharge head repeats the discharge operation based on the time-divisional driving as illustrated in FIGS. 9B, 9C, and 9D. Then, the discharge operation returns to FIG. 9A. As described above, the discharge orifices 6 in the same set of the pressure chambers 16 in a discharge-orifice row 12 do not discharge successively. Instead, the liquid discharge head discharges while switching the discharge-orifice rows 12. Thus, the liquid discharge head can discharge without being affected by the crosstalk in the same set of pressure chambers, which can suppress the deterioration of recording quality. In the present embodiment, when the liquid discharge head discharges at the discharge timings T1 to T4, the liquid discharge head discharges consecutively from next adjacent discharge-orifice rows, but the sequence of discharge is not limited to this. The liquid discharge head may use any discharge-orifice row 12 insofar as the liquid discharge head does not successively discharge from the discharge orifices 6 in the same pressure chamber and the liquid discharge head discharges in accordance with the sequential driving at the timings of T1 to T4 using the discharge orifices 6 in the entire discharge-orifice row group 121. In the present embodiment, the liquid discharge head discharges in the order of the operations of FIGS. 9A, 9B, 9C, and 9D, but this order may change. Moreover, the liquid discharge head can discharge using a single pattern of the time-divisional driving, for example, only using the pattern illustrated in FIG. 9A.

In the present embodiment, one set of pressure chambers includes two pressure chambers 16, and one discharge-orifice row group includes four discharge-orifice rows. In order to obtain advantageous effects of the present embodiment, the required number of the discharge-orifice rows 12 included in each one of the discharge-orifice row groups 121 and 122 is determined by the number of time divisions N and also by the number of discharge orifices M connected to the pressure chambers 16 included in the one set of pressure chambers 16. In the case of M>N, it is required to provide at least N rows of the discharge-orifice row 12, which is the same number of time divisions N. In the case of M<N, on the other hand, it is sufficient to provide at least M rows of the discharge-orifice row 12. In other words, in the case where the number of the discharge orifices in the same pressure chamber is smaller than the number of time divisions, it is sufficient to provide a smaller number of the discharge-orifice rows 12 than the number of time divisions. In the case of M=N, it is required to provide at least M rows (or N rows) of the discharge-orifice row 12.

Third Embodiment—Provision of Another Set of Non-Dividing Portions

Figure 10:
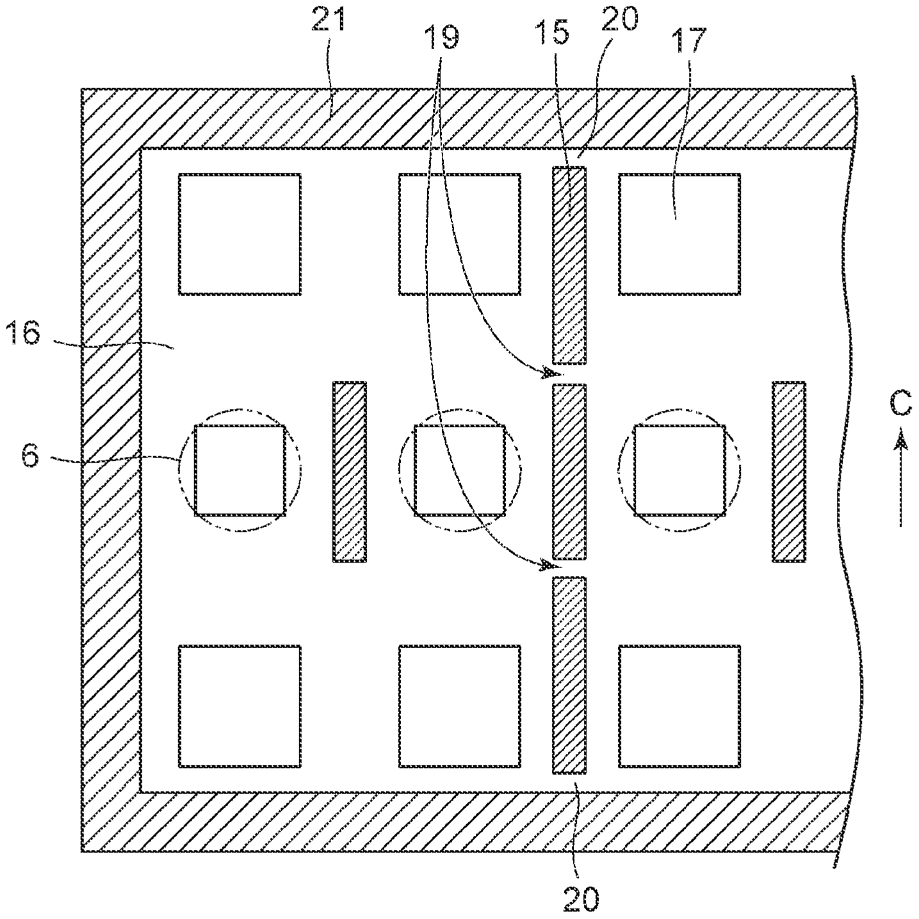
FIG. 10 is a cross-sectional view illustrating a liquid discharge substrate according to a third embodiment.

A third embodiment of a liquid discharge head according to the present disclosure will be described with reference to FIG. 10. FIG. 10 is a cross-sectional view corresponding to FIG. 3C. In the first and second embodiments, two non-dividing portions 19 are formed in each individual partition wall 15 at symmetrical positions with respect to a line connecting the centers of the discharge orifices 6. The non-dividing portions 19 are positioned so as to align in the direction orthogonal to the discharge-orifice row 12, and the individual partition wall 15 is in contact with the discharge-orifice-row forming partition 21. In the present embodiment, on the other hand, second non-dividing portions 20 are provided between the individual partition wall 15 and the discharge-orifice-row forming partition 21.

In other words, the second non-dividing portions 20 are formed between each individual partition wall 15 and the interior walls of the pressure chamber. Providing the second non-dividing portions 20 further release forces generated by the swelling and further reduce deformation. The dimension of each second non-dividing portion 20 is similar to that of the non-dividing portion 19. Even if the gap of each second non-dividing portion 20 is small, it works effectively. The gap can be made small in view of the influence of the crosstalk.

The second non-dividing portions 20 can be made larger than the non-dividing portions 19 because they are positioned further away from the discharge orifices 6 than the non-dividing portions 19. Here, the expression "the second non-dividing portions 20 is made larger than the non-dividing portions 19" means that the length of each second non-dividing portion 20 is larger than the length of each non-dividing portion 19 in the extending direction of the individual partition wall 15 (in the direction C). A larger space can be provided by making the second non-dividing portions 20 larger. As a result, functional components, such as electrodes, required for the liquid discharge substrate can be disposed in the space while the discharge orifices are disposed densely. In the present embodiment, the gap of the second non-dividing portion 20 is 27 μm.

Fourth Embodiment—Provision of Multiple Partition Walls

Figure 11:
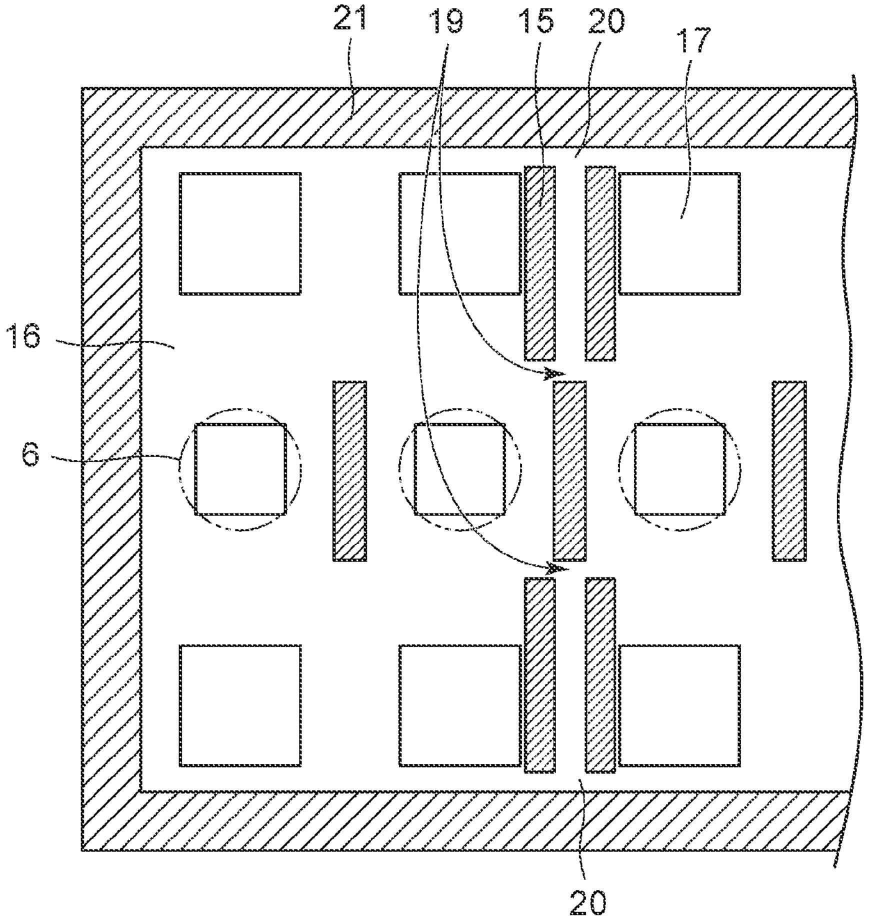
FIG. 11 is a cross-sectional view illustrating a liquid discharge substrate according to a fourth embodiment.
Figure 16:
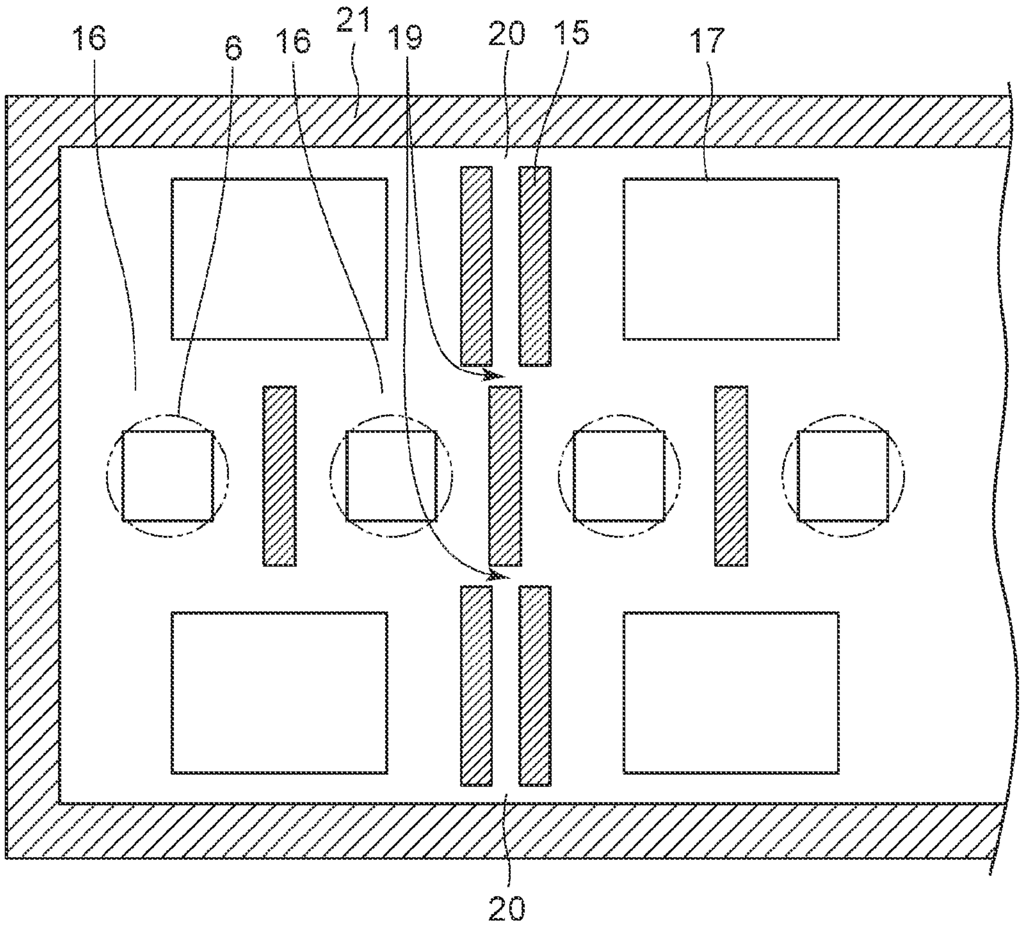
FIG. 16 is a view illustrating a modification example of the liquid discharge substrate of FIG. 11.

A fourth embodiment of a liquid discharge head according to the present disclosure will be described with reference to FIGS. 11 and 16. FIG. 11 is a cross-sectional view corresponding to FIG. 3C and illustrating a liquid discharge substrate. FIG. 16 illustrates a modification example of the liquid discharge substrate of FIG. 11. In the first to third embodiments, the individual partition wall 15 separates adjacent pressure chambers 16 that are arrayed in the extending direction of the discharge-orifice row. In the present embodiment, however, two individual partition walls 15 are provided at each side near the discharge-orifice-row forming partition 21. If the dimension of the individual partition wall 15 in the extending direction of the discharge-orifice row increases, the bonding strength of the individual partition wall 15 to the substrate 11 and to the discharge-orifice defining member 10 increases, but the shear stress caused by the swelling also increases, which influences the deformation of the discharge-orifice defining member 10 and consequently influences the deformation of the discharge orifices 6. If the dimension of the individual partition wall 15 in the extending direction of the discharge-orifice row is reduced too much, the distance between adjacent individual partition walls 15 increases, and the shear stress acting between the individual partition wall 15 and the discharge-orifice defining member 10 also increases, which influences the deformation of the discharge orifices 6. In order to improve this situation, it is desirable to provide multiple individual partition walls 15 having a smaller dimension in the extending direction of the discharge-orifice row. In the present embodiment, two individual partition walls 15 each having a dimension of 5 μm in the extending direction of the discharge-orifice row are provided at positions spaced at 6 μm. This can further reduce the shear stress acting between each individual partition wall 15 and the discharge-orifice defining member 10 compared with the case of one 5 μm thick individual partition wall 15. In addition, this can further reduce the shear stress generated by the swelling compared with the case of one 16 μm thick individual partition wall 15. The amount of the shear stress acting between each individual partition wall 15 and the discharge-orifice defining member 10 is substantially equal to that in the case of a single 5 μm thick individual partition wall 15. With this configuration, a liquid discharge head that can reduce the deformation of the discharge orifices while providing the necessary area for adhesion can be produced.

Although multiple individual partition walls 15 are formed near the discharge-orifice-row forming partition 21 in the present embodiment, multiple individual partition walls 15 may be provided near the center of the pressure chamber. Moreover, as illustrated in FIG. 16, the liquid discharge substrate may be configured such that the liquid is supplied to two pressure chambers from one individual channel 17 and multiple individual partition walls 15 are provided.

Fifth Embodiment—Dummy Pressure Chamber

Figure 12:
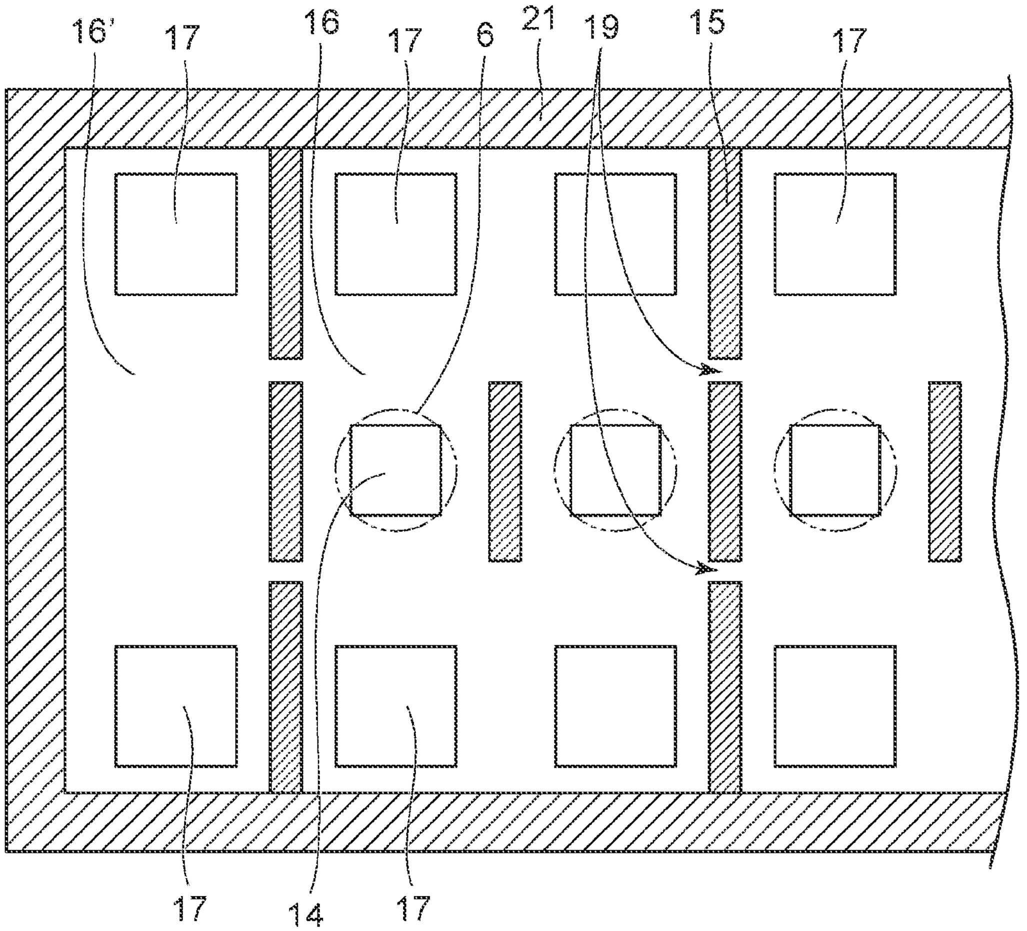
FIG. 12 is a cross-sectional view illustrating a liquid discharge substrate according to a fifth embodiment.

A fifth embodiment of a liquid discharge head will be described with reference to FIG. 12. FIG. 12 is a cross-sectional view corresponding to FIG. 3C and illustrating a liquid discharge substrate. In the first to fourth embodiments, a pressure chamber 16 is present at each end of the discharge-orifice row 12, and this pressure chamber 16 has the discharge orifice 6 and the pressure generating element 14. In the present embodiment, however, a dummy pressure chamber 16' is disposed at the end of the discharge-orifice row 12, and the dummy pressure chamber 16' is separated by the individual partition wall 15 from the next pressure chamber 16. Compared with the individual partition wall 15, the discharge-orifice-row forming partition 21 has a larger surface in the direction parallel to the discharge-orifice defining member 10 in order to prevent the ink from leaking from the edges of the liquid discharge substrate. As a result, the individual partition wall 15 and the discharge-orifice-row forming partition 21 deform differently due to swelling. This difference in deformation causes unbalanced deformation of the discharge orifice at the end of the discharge-orifice row. The unbalanced deformation of the discharge orifice results in deviation in the discharge direction, which leads to the deterioration of recording quality. To prevent this, the dummy pressure chamber 16' that does not discharge is provided, and an individual partition wall is formed to separate it from the next pressure chamber 16. Accordingly, both sides of the pressure chamber 16 located at each end of the discharge-orifice row are partitioned by the individual partition walls 15, which equalizes the deformation caused by the swelling and thereby reduces the deviation in the discharge direction. In the present embodiment, the dummy pressure chambers 16' is not involved in printing and does not have the discharge orifice 6 and the pressure generating element 14. The dummy pressure chamber 16', however, may have the discharge orifice 6 and the pressure generating element 14.

Sixth Embodiment

Figure 13A:
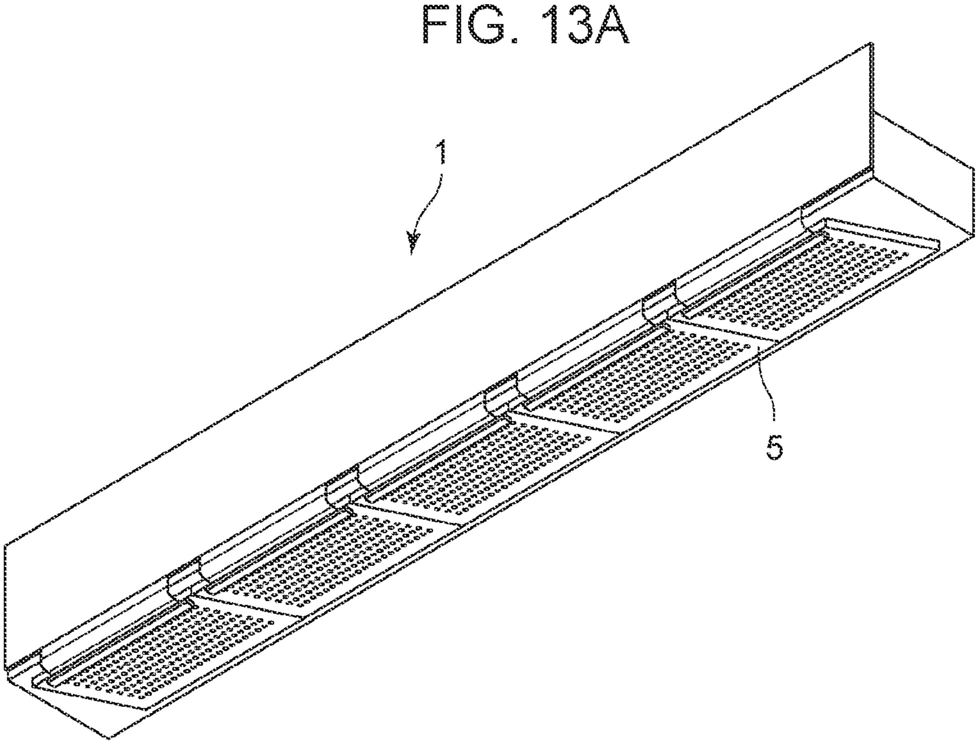
FIGS. 13A and 13B are schematic views illustrating a liquid discharge head according to a sixth embodiment.
Figure 13B:
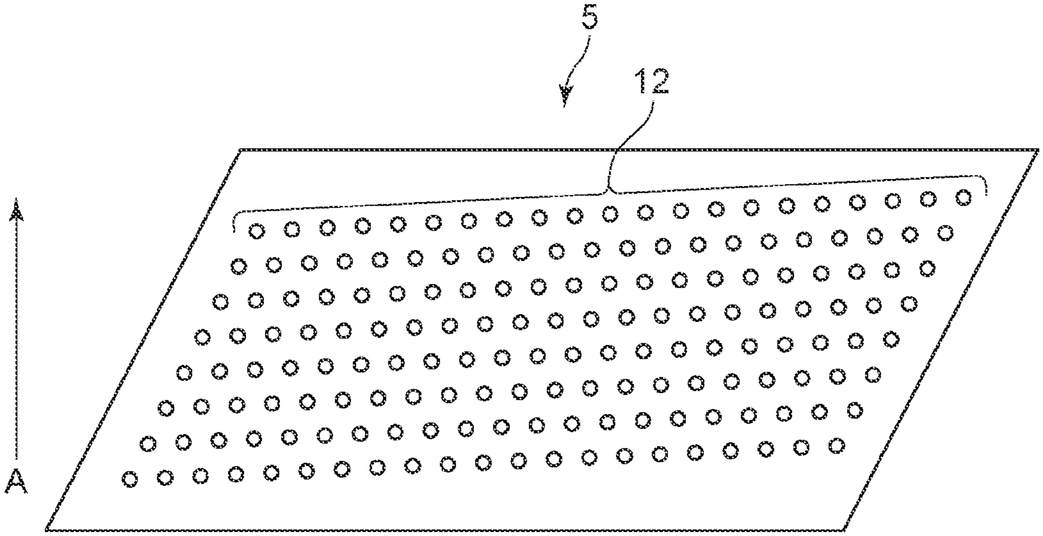

A sixth embodiment of a liquid discharge head according to the present disclosure will be described with reference to FIG. 13. FIG. 13A is a schematic view illustrating a liquid discharge head 1 of the present embodiment, and FIG. 13B is a schematic view illustrating a liquid discharge substrate 5 of the present embodiment.

In the first to fifth embodiments, the liquid discharge substrate 5 is shaped like a rectangle. The liquid discharge substrate 5 in the present embodiment is shaped like a parallelogram. The likelihood of the crosstalk can be reduced also with this configuration. A region of the liquid discharge substrate 5 over a certain distance from an end may be used to improve the strength of the liquid discharge substrate 5 or to provide a space for wiring, and the discharge orifices 6 may not be formed in such a region. In this case, if the liquid discharge substrates 5 are disposed in a row extending in the direction orthogonal to the conveyance direction A of the record medium, regions having no discharge orifice 6 may be present along the liquid discharge head 1 in the longitudinal direction thereof, which leads to the deterioration of recording quality. To avoid this, the liquid discharge substrates 5 may be disposed obliquely relative to the conveyance direction A of the record medium 2 in such a manner that the discharge orifices 6 that belong to adjacent liquid discharge substrate 5 and discharge the same brightness ink are put together. In this case, adjacent liquid discharge substrates 5 may be disposed as follows.

Disposition of Parallelogrammic Liquid Discharge Substrates

Figure 14A:
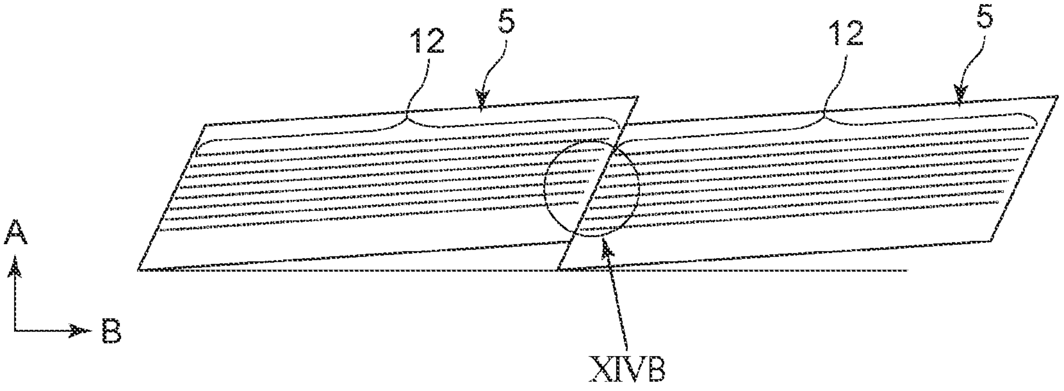
FIGS. 14A and 14B are schematic views illustrating two liquid discharge substrates disposed linearly.
Figure 14B:
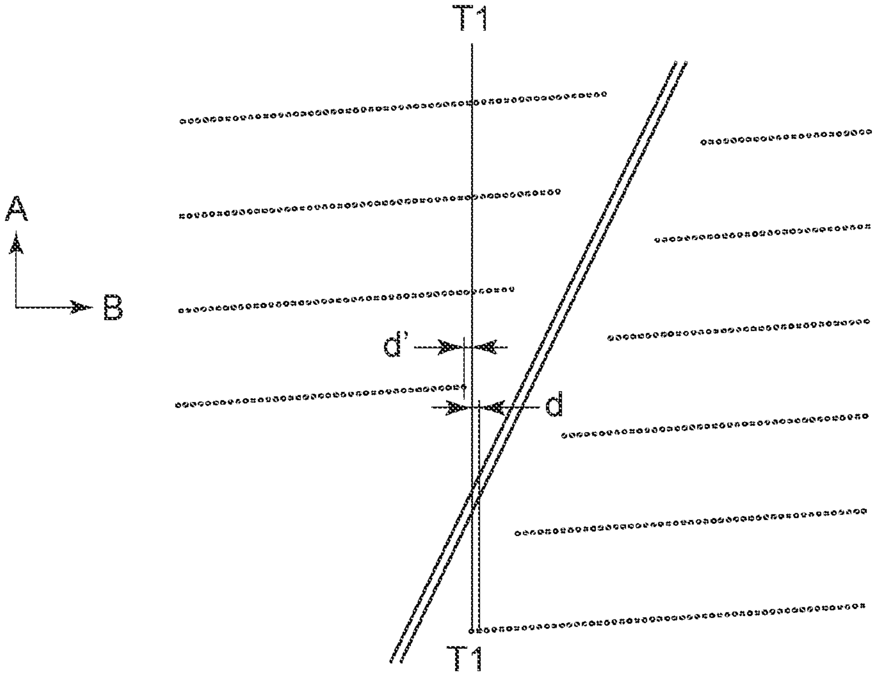

FIG. 14A is a schematic view illustrating an arrangement of two adjacent substrates, and FIG. 14B is an enlarged view illustrating region XIVB in FIG. 14A. In FIGS. 14A and 14B, the shape of each liquid discharge substrate 5 is different from that described previously. In FIGS. 14A and 14B, the positions of discharge orifices 6 of adjacent substrates can be seen more clearly. The arrangement described in FIGS. 14A and 14B is applicable to the above-described embodiments.

In FIG. 14A, one liquid discharge substrate 5 has eight discharge-orifice rows 12, and two discharge-orifice rows 12 form one discharge orifice group. As illustrated in FIG. 14B, in the same discharge-orifice rows 12 of respective liquid discharge substrates 5 disposed adjacently, it is desirable that a distance d between adjacent discharge orifices 6 in the direction (direction B) orthogonal to the conveyance direction A of the record medium be equal to a distance d' between adjacent discharge-orifice rows 12 in the same liquid discharge substrate 5.

Arranging the liquid discharge substrates 5 in this manner enables a portion between adjacent liquid discharge substrates 5 to perform recording in the quality similar to the other portion of the liquid discharge substrate 5. In the present embodiment, as illustrated in FIG. 14B, adjacent discharge orifices 6 included in respective adjacent liquid discharge substrates 5 and located at the same position in the direction (direction B) orthogonal to the conveyance direction A of the record medium desirably discharge at the same discharge timing (T1). With this configuration, the positional deviation associated with the time-divisional driving does not occur between different liquid discharge substrates 5, which reduces the deterioration of recording quality.

Seventh Embodiment

Figure 15:
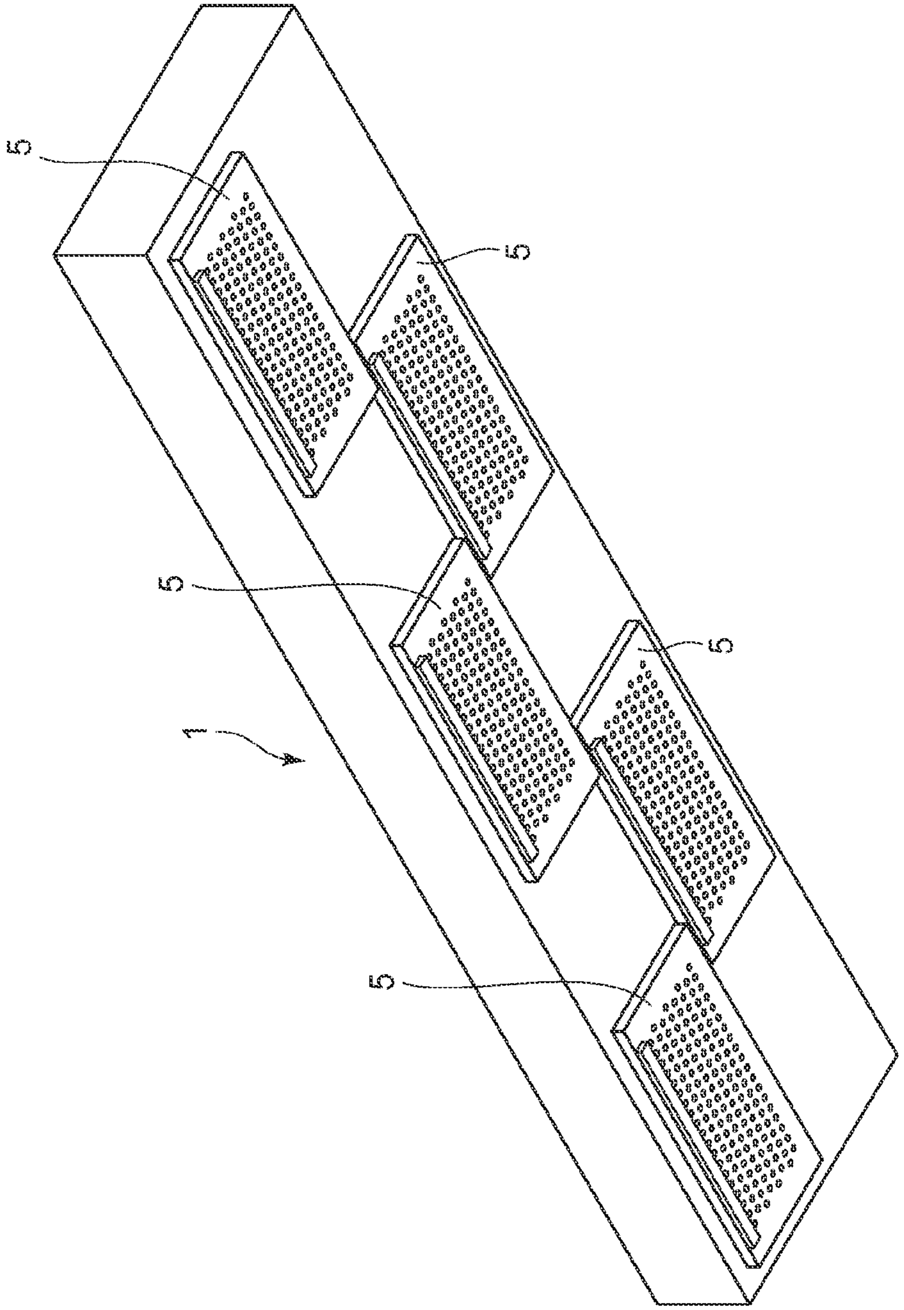
FIG. 15 is a schematic view illustrating a liquid discharge head according to a seventh embodiment.

A seventh embodiment of a liquid discharge head will be described with reference to FIG. 15. FIG. 15 is a schematic view illustrating the liquid discharge head according to the present embodiment. In the first to fourth embodiment, the liquid discharge substrates 5 are arranged in a row extending in the longitudinal direction of the liquid discharge head. In the present embodiment, the liquid discharge substrates 5 are arranged in a staggered manner. A region of the liquid discharge substrate 5 over a certain distance from an end may be used to improve the strength of the liquid discharge substrate 5 or to provide a space for wiring, and the discharge orifices 6 may not be formed in such a region. In this case, if the liquid discharge substrates 5 are arranged in one row, regions having no discharge orifice 6 may be present along the liquid discharge head 1 in the longitudinal direction thereof, which leads to the deterioration of recording quality. To avoid this, the liquid discharge substrates 5 are known to be arranged in the staggered manner so that the discharge orifices 6 can be distributed uniformly. The likelihood of the crosstalk can be reduced with this configuration in which the liquid discharge substrates 5 are arranged in the staggered manner.

The present disclosure can provide the liquid discharge head that can reduce the influence of the crosstalk and can prevent the discharge-orifice defining member from deforming excessively.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-072521 filed Apr. 22, 2021, which is hereby incorporated by reference herein in its entirety.

What is claimed is:

1. A liquid discharge head comprising:

a liquid discharge substrate having
- a discharge-orifice row having multiple discharge orifices that discharge a liquid to a record medium conveyed in a first direction,
- multiple pressure generating elements that generate pressure for discharging the liquid from respective discharge orifices, and
- multiple pressure chambers that communicate with respective discharge orifices and in which the pressure generated by respective pressure generating elements is transmitted, wherein the discharge orifices in the discharge-orifice row are allocated in multiple blocks and the liquid is discharged from the discharge orifices using sequential driving in a block-by-block manner, the discharge-orifice row is inclined at an angle $\theta = \text{Arctan}(d1/d2)$ relative to a second direction extending orthogonal to the first direction, in which d1 (μm) is a disposition spacing of the discharge orifices in the discharge-orifice row in the first direction and d2 (μm) is a disposition spacing of the discharge orifices in the discharge-orifice row in the second direction, a partition wall, including a plurality of wall portions, is formed between adjacent pressure chambers so as to separate the adjacent pressure chambers from each other, and the partition wall has a plurality of communicating portions that communicates the adjacent pressure chambers with each other, wherein each of the communicating portions is disposed between two wall portions of the plurality of wall portions.

2. The liquid discharge head according to claim 1
wherein the communicating portions are formed at symmetrical positions with respect to a line connecting centers of the discharge orifices in the discharge-orifice row.

3. The liquid discharge head according to claim 1,
wherein a length of the partition wall in the second direction is 10 μm or less.

4. The liquid discharge head according to claim 1,
wherein a length of the partition wall in the second direction is 5 μm or less.

5. The liquid discharge head according to claim 1,
wherein the partition wall has a second communicating portion that is formed at a position between the partition wall and an interior wall of the pressure chamber so as to communicate the adjacent pressure chambers with each other.

6. The liquid discharge head according to claim 5,
wherein the second communicating portion is longer than the communicating portion in an extending direction of the partition wall.

7. The liquid discharge head according to claim 1,
wherein an angle between an extending direction of the partition wall and the conveyance direction is 8.

8. The liquid discharge head according to claim 1,
wherein a plurality of the partition walls is formed in a disposition direction of the discharge orifices.

9. The liquid discharge head according to claim 1,
wherein a dummy pressure chamber that is not used for liquid discharge is formed at an end of the discharge-orifice row in the second direction and is adjacent to the pressure chamber in a disposition direction of the discharge orifices, and
the partition wall is formed between the dummy pressure chamber and the pressure chamber next to the dummy pressure chamber.

10. The liquid discharge head according to claim 1,
wherein one of the multiple pressure chambers communicates with the multiple discharge orifices.

11. The liquid discharge head according to claim 1,
wherein a plurality of the liquid discharge substrates is disposed linearly in the second direction.

12. The liquid discharge head according to claim 1,
wherein a plurality of the liquid discharge substrates is disposed in the second direction in a staggered manner.

13. The liquid discharge head according to claim 1,
wherein the liquid discharge substrate is shaped like a parallelogram.

14. The liquid discharge head according to claim 1,
wherein the liquid circulates between the inside and the outside of the pressure chambers.

* * * * *